(12) United States Patent
Cloonan

(10) Patent No.: US 6,898,182 B1
(45) Date of Patent: May 24, 2005

(54) CONGESTION CONTROL IN A NETWORK DEVICE HAVING A BUFFER CIRCUIT

(75) Inventor: Thomas J. Cloonan, Lisle, IL (US)

(73) Assignee: Arris International, INC, Suwanee, GA (US)

( * ) Notice: Subject to any disclaimer, the term of this patent is extended or adjusted under 35 U.S.C. 154(b) by 372 days.

(21) Appl. No.: 09/620,821

(22) Filed: Jul. 21, 2000

(51) Int. Cl.[7] .................. G01R 31/08; G06F 11/00; G08C 15/00; H04J 1/16; H04J 3/14
(52) U.S. Cl. .................. 370/232; 370/235; 370/412
(58) Field of Search .................. 370/229–236, 370/412–413, 415, 417, 428, 389, 395; 710/52, 54, 57; 570/429

(56) References Cited

U.S. PATENT DOCUMENTS 6,081,505 A * 6/2000 Kilkki .................. 370/230
6,137,793 A * 10/2000 Gorman et al. .................. 370/360
6,247,061 B1 * 6/2001 Douceur et al. .................. 709/240
6,252,848 B1 * 6/2001 Skirmont .................. 370/229

* cited by examiner

Primary Examiner—Seema S. Rao
Assistant Examiner—Kevin C. Harper
(74) Attorney, Agent, or Firm—John L. Doughty

(57) ABSTRACT

Each packet of the present invention is assigned a priority level. The current data packet flow rate is detected. This data packet flow rate is quantized into at least one data rate level. The current buffer circuit depth is determined as is the priority associated with the current data packet. The probability that the current packet is either dropped or used is determined by using the current data packet service flow rate, the data packet priority, and the current buffer circuit depth.

3 Claims, 5 Drawing Sheets

FIG. 3

CURRENT FLOW RATE

| CURRENT PACKET PRIORITY | MINth, MAXth, Pa | NEEDY | NORMAL | GREEDY | SURER-GREEDY |
|---|---|---|---|---|---|
| PRIORITY 0 | | 98%<br>99%<br>0.1 | 75%<br>95%<br>0.1 | 65%<br>85%<br>0.1 | 5%<br>25%<br>0.1 |
| PRIORITY 1 | | 98%<br>99%<br>0.1 | 65%<br>85%<br>0.1 | 55%<br>75%<br>0.1 | 5%<br>25%<br>0.1 |
| PRIORITY 2 | | 98%<br>99%<br>0.1 | 55%<br>75%<br>0.1 | 45%<br>65%<br>0.1 | 5%<br>25%<br>0.1 |
| PRIORITY 3 | | 98%<br>99%<br>0.1 | 45%<br>65%<br>0.1 | 35%<br>55%<br>0.1 | 5%<br>25%<br>0.1 |
| PRIORITY 4 | | 98%<br>99%<br>0.1 | 35%<br>55%<br>0.1 | 25%<br>45%<br>0.1 | 5%<br>25%<br>0.1 |
| PRIORITY 5 | | 98%<br>99%<br>0.1 | 25%<br>45%<br>0.1 | 15%<br>35%<br>0.1 | 5%<br>25%<br>0.1 |

ENSURES Tmin IS GUARANTEED

ENSURES Tmax IS A PSEUDO-HARD LIMIT

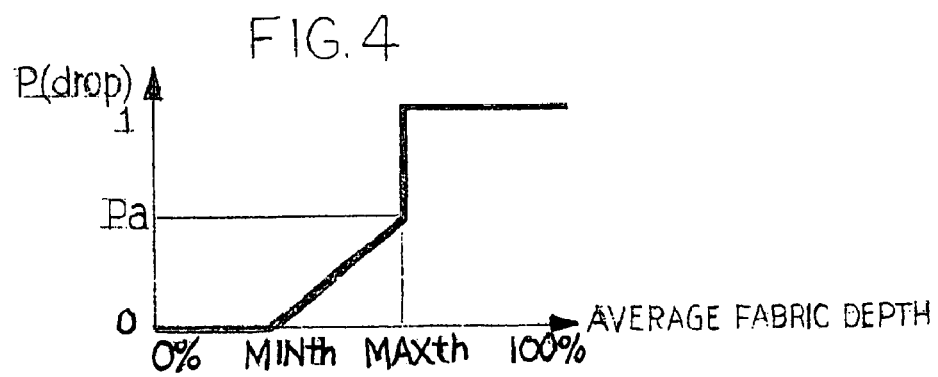

FIG. 4

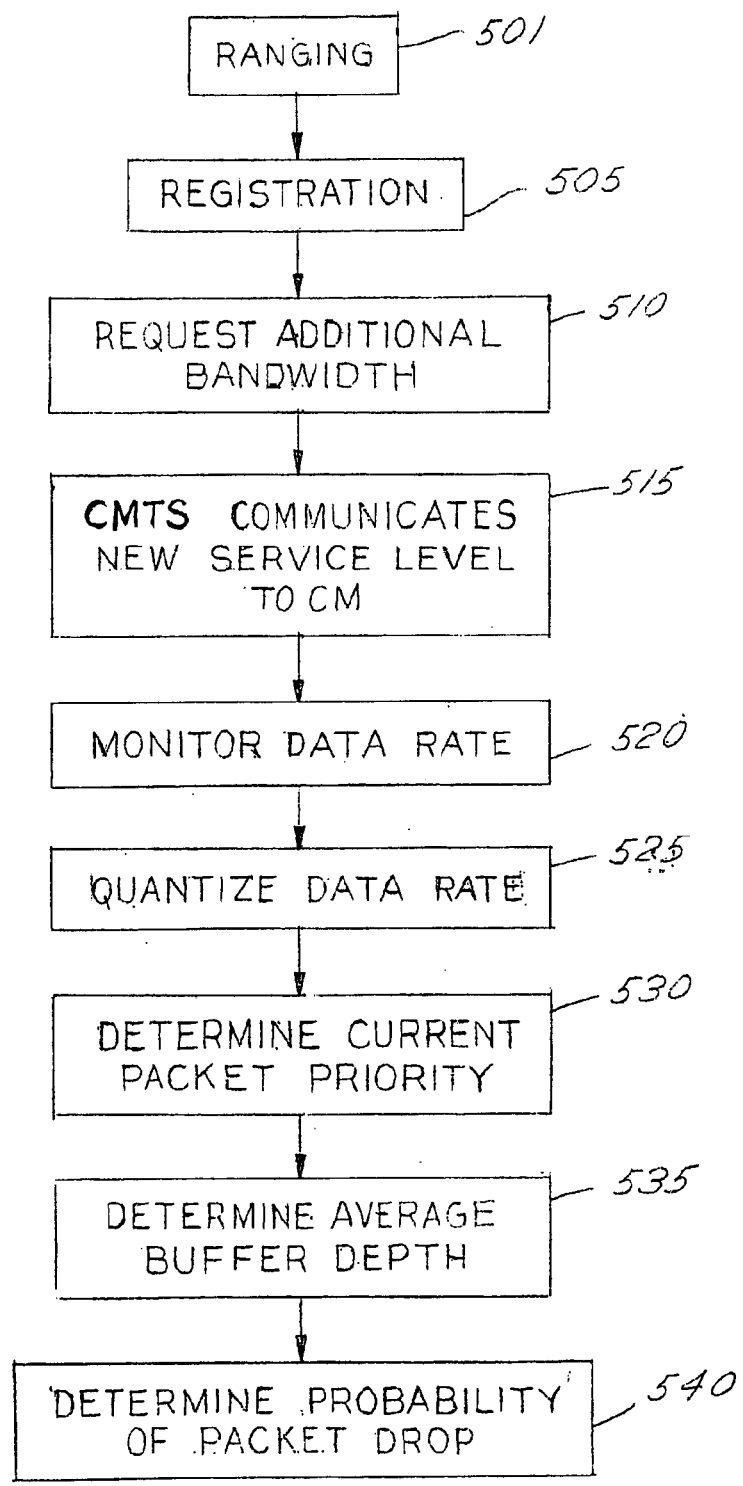

CONGESTION CONTROL IN A NETWORK DEVICE HAVING A BUFFER CIRCUIT

FIELD OF THE INVENTION

The present invention relates generally to data flow control. Particularly, the present invention relates to control of congestion in a buffer circuit.

DESCRIPTION OF THE RELATED ART

In order to provide more service to their subscriber base, cable television companies are offering access to the Internet through their cable modem (CM) boxes. The benefits in using the cable companies instead of a dial-up Internet Service Provider is multiple services under one bill, always-on access, and, in some cases, higher speed access.

In order to provide their customer's with Internet access, the cable companies use some of the 50–800 MHz spectrum typically set aside for their television channels to provide the bandwidth required for the data transfers. A typical cable system has the bandwidth to provide 100 television channels to its subscribers. Each NTSC television signal requires 6 MHz of bandwidth.

In order for a cable subscriber to access the Internet through their cable television provider, the subscriber must have a CM. The CM is similar to the Cable Modem Termination System (CMTS) equipment required at the cable company's headquarters, except for the greater size required at the headquarters. This is to accommodate a greater number of signals than is required by the home modem.

The home CM box and the CMTS use well-known Ethernet frames to communicate between them. The cable system, however, uses a different modulation scheme, Quadrature Amplitude Modulation (QAM), than is normally used in an Ethernet scheme.

Using the QAM modulation, the downstream (from the cable company equipment to the home CM) data rate is in the range of 30–40 Mbps for each 6 MHz channel. This can accommodate between 500 and 2000 subscribers. The more subscribers that the cable company tries to fit in that spectrum, the lower the bandwidth available for each subscriber.

The upstream data flow is different and more complex. In the past, cable companies did not have to worry about providing bandwidth for the customer to communicate in the upstream direction. Pay-per-view movies and sports events, however, required this ability. The cable companies, therefore, set aside the 5–42 MHz spectrum to allow the home CM to communicate in the upstream direction. The cable companies now use this 5–42 MHz spectrum to provide the necessary upstream access to the Internet from the home CM.

Cable companies, as well as other Internet Service Providers, are currently introducing Quality of Service (QoS) to Internet access. The current Internet routing model of "best effort" service now provided to all users, packets, and traffic flows is being replaced with services that differentiate between packets.

Some current Internet access schemes to increase QoS incorporate different priority levels for data packets. High priority packets will be routed with low latency and low jitter while low priority packets may experience more delay and jitter. The throughput needs of each application determine the priority associated with its corresponding traffic flows. It is likely that advanced application programs in the future will dynamically change the priority of traffic flows to match the varying needs of the user throughout the entire duration of the user's session.

Another method presently used by cable companies to introduce higher quality Internet access service is to change the techniques presently used in dropping all overflow packets, increasing data throughput, and decreasing data throughput. If packets are dropped in a synchronized fashion, this synchronization of drops can lead to an inefficient use of the cable system bandwidth. Attempts at de-synchronization include the Random Early Discard (RED) scheme, which randomly drops user packets based on the current buffer depth within storage buffers in the cable data system.

FIG. 1 illustrates a typical prior art CMTS block diagram. The CMTS typically is comprised of a cable interface card (101) to provide the interface signals and modulation to the signals transmitted to the home modem. An Ethernet card (110) interfaces the CMTS to the Internet by providing appropriate timing, control, and data signal formats for the Internet. A buffer circuit (105) between the cable interface card (101) and Ethernet card (110) stores data in both the upstream and downstream directions when the processing in either the cable interface card or the Ethernet card is slower than the incoming data.

The Random Early Discard scheme samples the depth (amount of memory space used) of the buffer (105) and randomly drops packets to prevent the buffer from overflowing. Using this scheme, a cable subscriber may not lose any data or may lose a lot of data, depending on a purely random occurrence.

In the future, since all packets will not be passed using the same priority levels, all packets will not be billed the same charges. A subscriber who is paying more for his service will expect higher data throughput and less data loss than someone paying substantially less. There is a resulting need for an improved process and system for determining which data packets to drop before the buffer becomes overloaded. One technique that performs this task is the Weighted Random Early Discard (WRED) scheme, which randomly drops user packets based on current buffer depths and based on the priority of the packet. Packets associated with high-paying customers will be given higher priority and experience a lower probability of packet drops than packets associated with low-paying customers.

Although the use of the Weighted Random Early Discard scheme serves to differentiate users based on their priorities (which is usually related to their payment), it does not differentiate between two different customers who are assigned to the same priority level. In particular, the Weighted Random Early Discard scheme does not take into account the customer's recent utilization of the bandwidth. As a result, two customers that are both assigned to the same priority might be utilizing the bandwidth in two very different ways. One might have been actively using the bandwidth a lot in the last few minutes, and the other might not have been using the bandwidth at all during the last few minutes. Because of his or her low bandwidth activity levels in recent minutes, it seems fair that the second customer should be given precedence over the "recently greedy" first customer if both customers start to transmit packets simultaneously. The ability to store the activity state of each customer and use that activity state in the calculation of packet dropping probabilities in addition to the priority and the current packet buffer depths would therefore seem to be a useful and fair manner of controlling the flow of packets in a data communications system.

SUMMARY OF THE INVENTION

The present invention encompasses a process for providing data packet flow congestion control in a data network that has a buffer circuit. Each packet of the present invention is identified as belonging to a specific service flow, where a service flow is a series of packets that share something in common. The shared attributes could, for example, include a common source IP address and a common destination IP address within the packet headers of all of the packets within the service flow. A packet stream will typically contain many packets from many different service flows inter-mixed together. When each of these packets arrives at a network node, it must then be assigned a priority level. In the preferred embodiment, the priority level is based on the price a subscriber paid for their Internet access service.

The process begins by detecting the current data packet rate through the buffer circuit for the service flow associated with the arriving packet. This service flow's data packet rate is quantized into at least one activity level. In the preferred embodiment, the process uses four different activity levels for data rate. Each level is determined by a comparison to predetermined thresholds.

The current buffer circuit depth is then determined as is the priority associated with the current data packet. The current packet is either dropped or used depending on the current data packet flow rate, the data packet priority, and the current buffer circuit depth.

BRIEF DESCRIPTION OF THE DRAWINGS

FIG. 3 shows a matrix of settings for congestion control on the Cable Interface circuit and the Ethernet Interface circuit.

FIG. 4 shows a plot of the probability of dropping a packet versus the average buffer depth in accordance with the matrix of FIG. 3.

FIG. 5 shows a flowchart of the buffer congestion control process of the present invention.

DETAILED DESCRIPTION OF THE PREFERRED EMBODIMENT

The present invention provides congestion control of any data network circuit having a buffer. By tracking the data packet flow rate, data packet priority and buffer status, the packets can be dropped before they overflow the buffer.

Figure 1:
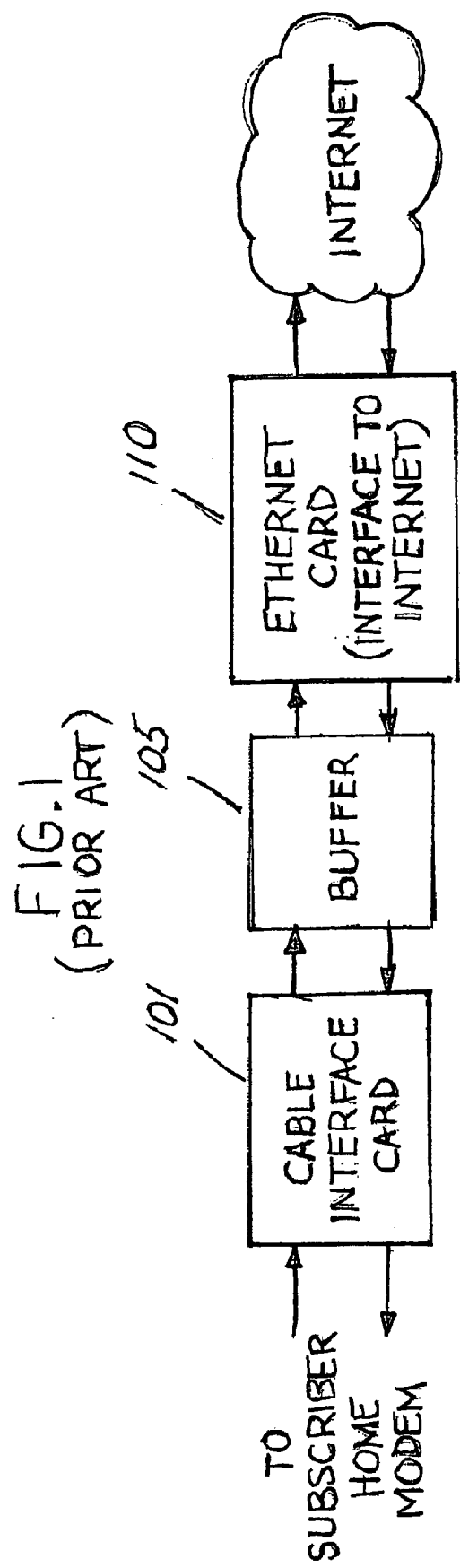
FIG. 1 shows a block diagram of a typical prior art cable modem termination system.
Figure 2:
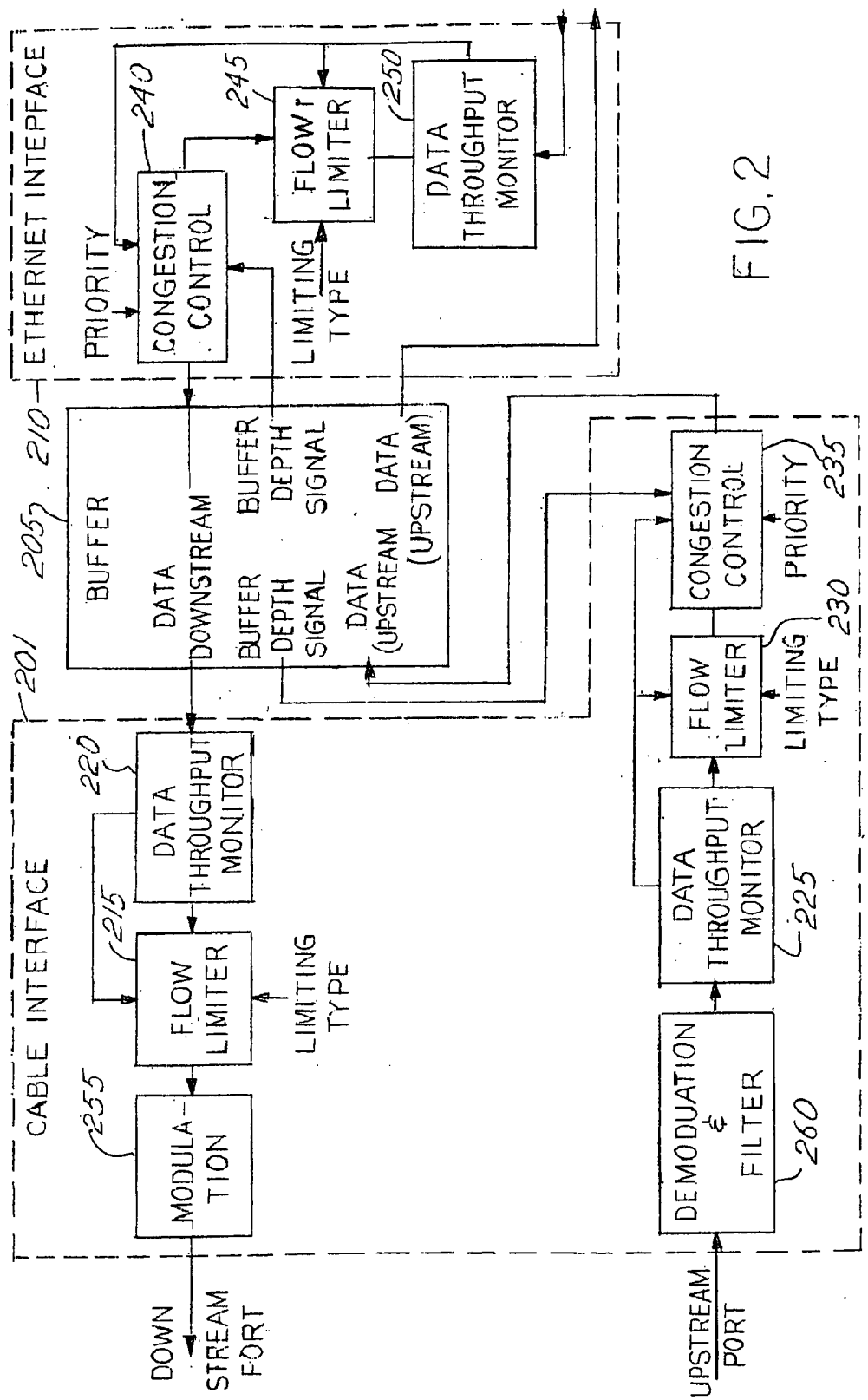
FIG. 2 shows a block diagram of the cable modem termination system apparatus of the present invention.

FIG. 2 illustrates the preferred embodiment cable modem termination system (CMTS) apparatus of the present invention. While the present invention will be described as applying to a cable modem, the congestion control can be applied to any data network comprising a buffer circuit.

The CMTS apparatus of FIG. 2 is comprised of a cable interface (201) that is coupled to a buffer circuit (205). The buffer circuit (205) is coupled to an Ethernet interface (210). In the preferred embodiment, each of the individual circuits (201, 205, and 210) reside physically on separate circuit boards. In alternate embodiments, any circuits having substantially the same function can reside on one circuit board or even one integrated circuit. In other words, the present invention is not limited to three separate circuit boards.

The cable interface (201) is responsible for interfacing the CMTS to the home cable modem apparatus. The cable interface (201) also provides the functions of modulation and demodulation.

The cable interface circuit is comprised of a downstream packet flow path and an upstream packet flow path. The downstream packet flow path is comprised of a data throughput monitor (220) that is coupled to a flow limiter (215). The data throughput monitor (220) has an input that is coupled to the buffer circuit (205) from which the data packets flow and a feedback from the upstream path. The feedback from the upstream path is to allow a first CM to talk with other CMs. The data throughput monitor (220) has the task of determining the rate of data packet flow.

In the preferred embodiment of the CMTS, the downstream data packet flow rate is typically either 30 or 40 Mbps for each 6 MHz channel, using QAM techniques. Alternate embodiments use other flow rates. The cable company decides which data packet flow rate depending on the outcome desired by the company. The lower data rate is less susceptible to noise while the higher data rate can include more data per unit of time for the customers.

The data packet flow rate signal is fed into the flow limiter (215). This signal controls the flow limiter function. If the flow is greater than a predetermined level, $T_{max}$, the data packet flow can be limited. The flow limiter (215) reduces the data rate by dropping packets until the flow is reduced to below $T_{max}$.

Another input to the flow limiter (215) is the "limiting type" input. This control input is set by the cable company depending on how strict they wish a customer to adhere to the rules. If the "limiting type" input is set to "soft-limiting", the flow limiter (215) allows the data rate to go above the set data rate by a predetermined amount without dropping any packets.

Some cable companies may strictly limit a customer to $T_{max}$. In this case, the "limiting type" control input is set to "hard-limiting". If the data rate goes over the set hard limit, the flow limiter (215) drops any packets that force the customer to exceed $T_{max}$. The output of the flow limiter (215) is coupled to the cable that runs to the customers' cable modems.

The output of the flow limiter (215) is input to the modulator (255). This block (255) performs the QAM needed to transmit the data to the CMs.

The upstream data path is comprised of a demodulator and filter (260) that converts the QAM signal into data bits in order to be processed by the other blocks in the upstream path. The demodulated data bits are input to a data throughput monitor (225) that is coupled to the upstream port from the customer's CM. This data throughput monitor (225) has the same functionality as the downstream monitor (220) of monitoring the data rate but in the upstream direction to the Internet.

In the preferred embodiment, the upstream data rate can be in the range of 320 kb to 10.24 Mbps. Alternate embodiments use other rates.

The upstream data throughput monitor (225) is coupled to a flow limiter (230). This flow limiter has similar functionality to the flow limiter (215) in the downstream path. The upstream path flow limiter (230) has the data rate input from the data throughput monitor (225) as well as the "limiting type" control input that, in the preferred embodiment, is set to either "hard-limiting" or "soft-limiting" depending on the cable company rules. As in the downstream flow limiter (215), the upstream flow limiter, depending on the "limiting type" input, drops all packets that force the customer to exceed $T_{max}$.

The upstream path further comprises a congestion control block (235) that is coupled to the upstream data path out of the flow limiter (230). The data packets from the upstream data path flow through the congestion control block (235) to the buffer circuit (205). The function of the congestion control block (235) is to drop packets when the buffer depth is reaching a maximum point. By dropping the packets before they reach the buffer, the buffer will not overflow.

In order to accomplish the task of congestion control, the congestion control block (235) has control inputs that are used to determine when to drop packets and which packets to drop. In the preferred embodiment, these control inputs include the data rate signal from the upstream data throughput monitor (225), a buffer depth signal from the buffer (205), and a priority signal.

The data rate signal from the upstream data throughput monitor (225), as described above, quantizes the data rate and feeds that value to the congestion control block (235). The buffer circuit depth signal from the buffer circuit (205) instructs the congestion control block (235) as to the depth of the buffer. In other words, if the buffer (205) is 75% full, the buffer depth signal instructs the congestion control block (235) of this.

The priority signal that is input to the congestion control block (235) informs the congestion control of the priority of each packet. This is important in determining which packets to drop.

A group of packets is assigned a priority based on the customer's level of service plan. If the customer has signed up for the basic service plan and paid the smallest fee for the most basic service, his packets are assigned a low priority. This priority is embedded in a packet identification that is assigned to the group of packets and is decoded when the group of packets enters the cable interface.

If the customer has signed up for the premium service plan with the cable company, his packets are assigned the highest priority. If the customer has signed up for any service plans that are in between the premium and the basic plans, this priority is also assigned to each packet. As described before, the priority is added to the packet identification for a particular group of packets.

A customer may also decide to dynamically change his service level for a given session. In this case, different packet groups from that particular customer will have different priorities assigned to different packet identifications.

As described subsequently in other figures, the congestion control block (235) of FIG. 2 uses the priority assigned to a group of packets to determine how to process that particular group of packets. The output of the congestion control block is input to the buffer circuit's upstream data flow input.

The buffer circuit (205) stores the packets until the Ethernet circuit (210) has time to process that packet. The packets are fed from the buffer circuit (205) to the Ethernet circuit (210) as more processing time is freed up.

The downstream path of the Ethernet circuit (210) is comprised of a data throughput monitor (250) that is coupled to the connection to the Internet. This monitor (250) provides substantially the same function as the previously described data throughput monitors on both the upstream and downstream paths.

The data packets from the Internet flow from the data throughput monitor (250) to the Ethernet's circuit flow limiter (245). This flow limiter (245) has substantially the same functionality as the above described flow limiters. This flow limiter also has the same inputs as described previously: the quantized data rate and the "limiting type" control input.

The data packets flow from the flow limiter (245) to the congestion control block (240). As in the upstream congestion control block (235), the Ethernet's downstream congestion control block (240) has the three control inputs to determine which packets to drop: the quantized data rate, the buffer depth signal, and the packet priority signal. The congestion control block then drops a particular packet based on these control signals.

The downstream data flows from the congestion control block to the buffer circuit (205). The buffer circuit (205) stores the packets until the cable interface circuit has the processing time to work on additional packets.

The buffer circuit (205) is comprised of 128 MB of RAM, in the preferred embodiment. Alternate embodiments use other values of RAM or even other types of memory instead of RAM. The alternate types of memory include hard drives or other types of temporary memory.

Most of the functions illustrated in FIG. 2 may be implemented in various ways. These functions can be performed in software by a processor or multiple processors performing each function. Each function can also be implemented in discrete logic hardware, a digital signal processor, or some other form of programmable logic.

FIG. 3 illustrates a matrix of settings for congestion control of the buffer circuit. These settings are an example of the preferred embodiment settings that were determined experimentally in field tests. Alternate embodiments use other settings.

The matrix illustrates the priority and the data flow rate. The priority indicates the bandwidth for which the customer has paid. The data flow rate indicates the bandwidth that the customer is actually using.

The matrix of FIG. 3 is comprised of columns under the current data flow rate across the top of the matrix. The data rate, in the preferred embodiment, is segmented into four different rates that are labeled needy, normal, greedy, and super-greedy. These data rates are based on the minimum bandwidth for which the customer signed up ($T_{min}$) and the maximum data rate that a customer requested during a session ($T_{max}$).

The data rate is considered "needy" when the rate is between 0 and $T_{min}$. If the data rate is between $T_{min}$ and $T_{max}$, this rate is considered normal. When the data rate goes above some mid-rate ($T_{mid}$) and $T_{max}$, this rate is labeled greedy. When a customer requests a data rate beyond $T_{max}$, the rate is considered super-greedy.

These labels and respective data rates are for illustration of the operation of the preferred embodiment only. Alternate embodiments use other labels for other data rate thresholds.

Referring again to the matrix of FIG. 3, the rows are labeled with six different priority levels that have been assigned to each data packet as the Current Packet Priority. The highest priority level is designated Priority 0. The lowest priority level is designated Priority 5. The mid-level priorities are labeled Priority 1, Priority 2, Priority 3, and Priority 4 in increasing priority levels.

The blocks that make up the intersection of each column (current data flow rate) and row (current packet priority) is comprised of three values that are further illustrated in the plot of FIG. 4 to be discussed subsequently. The upper number in each block represents the minimum threshold value (in percent) of the average buffer depth (amount of memory used). This value is subsequently referred to as $MIN_{th}$. The middle value in each block is the maximum threshold (in percent) of the average buffer depth. This value is subsequently referred to as $MAX_{th}$.

In the preferred embodiment, MINth and MAXth are average values. Alternate embodiments may use instantaneous values of the buffer depth for these thresholds.

The third value in each block is the probability of a packet being dropped. In the illustrated example, the probability of a packet being dropped is 0.1 and is referred to as $P_a$. This value for $P_a$ is a typical value and will be different for other embodiments.

The "needy" data rate column ensures that $T_{min}$ is guaranteed. The "super-greedy" column ensures that $T_{max}$ is a pseudo-hard limit. This limit is set by the cable company and may or may not be adhered to in limiting a customer's request for additional bandwidth. This is mostly a function of the buffer depth. If the buffer depth is low and customers are above their paid bandwidth limit, their packets will not be dropped. However, once the buffer approaches its limit and customers are above their paid bandwidth limit, their packets will be dropped to keep them from going over $T_{max}$.

The values of the matrix of FIG. 3 were determined by expanding on the concepts in Weighted Random Early Discard (WRED). WRED is similar to the RED technique described above except it assigns a high priority (lower packet loss probability) to some data packets and a low priority (higher packet loss probability) to other data packets. For example, voice may be assigned a high priority while email may be assigned a low priority. In a congestion situation, the lower priority packets are discarded before the higher priority packets.

If WRED were used to determine the values in the blocks of the FIG. 3 matrix, all of the entries across a given row would be the same. If RED were used to determine the values, all of the entries would be the same. Using an extension of WRED, different values can be determined for each row of the matrix.

Each block of the matrix of FIG. 3 determines the appearance of the plot illustrated in FIG. 4. The plot of FIG. 4 has the average buffer depth running along the x-axis and the probability of dropping a packet ($P_{drop}$) running along the y-axis.

This plot illustrates that as the average buffer depth approaches $MIN_{th}$, the probability of a packet being dropped is 0%. This is due to the fact that the buffer depth is not yet high, so there is no need to drop any packets.

As the average buffer depth increases along the x-axis and approaches $MAX_{th}$, the probability of a packet being dropped increases to $P_a$. A typical value of $P_a$, as illustrated in the matrix of FIG. 3, is 0.1. When the average buffer depth exceeds $MAX_{th}$, all packets are dropped with a probability of 1.0.

As a safety mechanism to keep the buffer circuit from overflowing, once the instantaneous buffer depth goes beyond 99%, all packets are dropped. The priority of the packet is irrelevant.

The process used by the present invention is illustrated in FIG. 5. The process begins with the CM registering with the cable system according to the Data Over Cable Service Interface Standard (DOCSIS).

The CM and the CMTS go through a ranging process (step 501) to get the CM on a channel that is acceptable to the CMTS. The ranging step (step 501) also includes determining the power level required by the CMTS from the CM.

The CM next goes through the registration process (step 505) to get the information required to be an Internet Protocol (IP) host, such as the IP address, from the Dynamic Host Configuration Protocol (DHCP) server. During this registration process, the CM also downloads, from the a Trivial File Transfer Protocol (TFTP) server, the service level and other service information for that particular CM.

The process of the present invention enables the customer to change his service level temporarily and dynamically, depending on the bandwidth he needs at the moment. This can be accomplished by the customer informing the CMTS of the additional bandwidth request (step 510).

The CMTS then informs the CM of the new service level (step 515). As the customer is using the service, the CMTS is monitoring the data flow rate (step 520) so that it knows the amount of bandwidth the customer is using in relation to the bandwidth for which the customer has paid.

The data packet rate is quantized to one of four levels (step 525), depending on the rate required by the customer's use. These levels, as discussed above, include needy, normal, greedy, and super-greedy.

Since the current packet priority is in the header of each packet, the process determines the current packet priority (step 530) by reading the packet header. The process also determines the average buffer depth (step 535) to determine the amount of memory remaining in the buffer.

By using the data rate, current packet priority, and average buffer depth, the process accesses the proper block of the matrix of FIG. 3 to determine the probability that a packet should be dropped (step 540).

Figure 6:
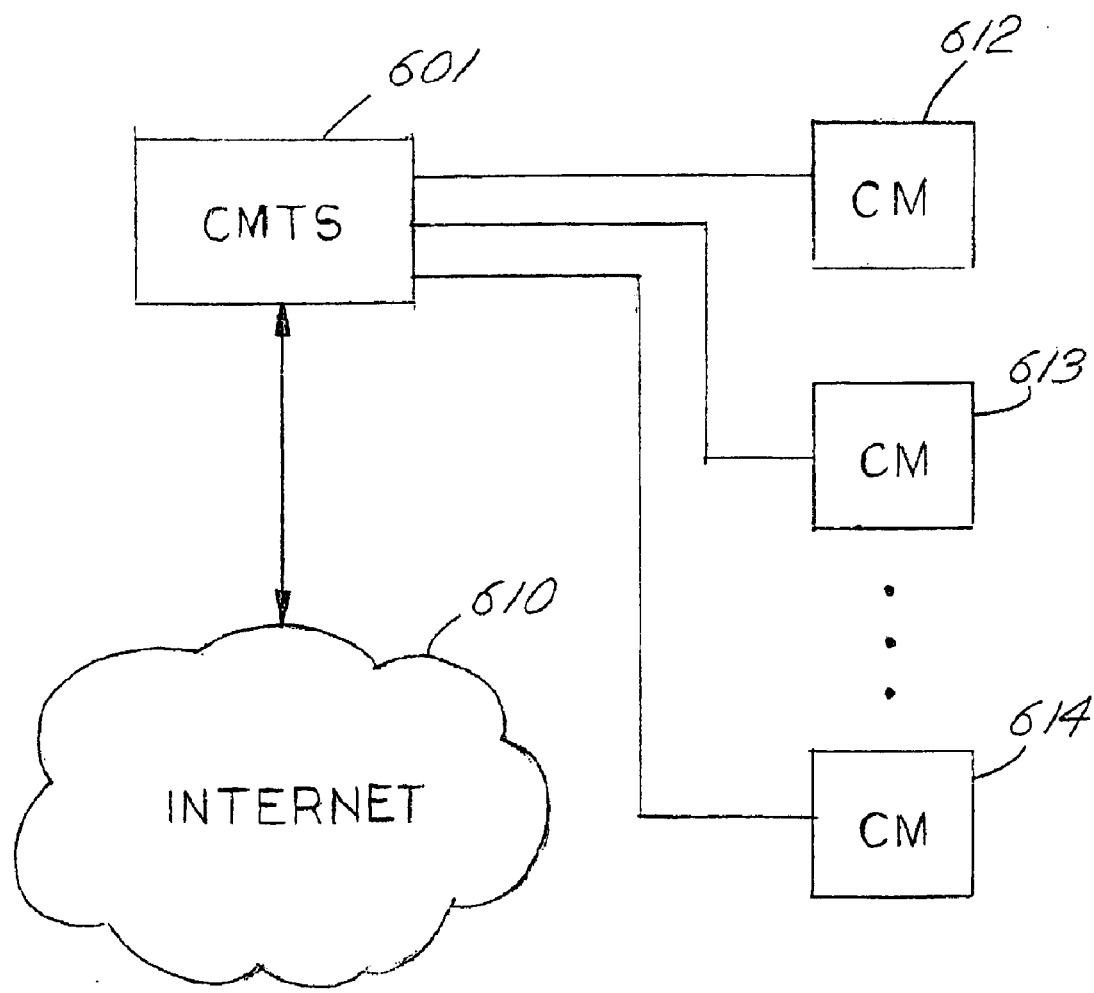
FIG. 6 shows a block diagram of a system incorporating the cable modem apparatus of the present invention.

FIG. 6 illustrates a system block diagram of the present invention. This system is comprised of the CMTS (601) that is coupled to the Internet (610). The CMTS is located at the cable company headquarters.

The CMTS is coupled to a larger number of CMs (612–614). For purposes of clarity, only three CMs are shown. However, as described above, the CMTS may communicate with thousands of CMs, depending on how the cable company set up the system.

In summary, the process and apparatus of the present invention provides congestion control of a buffer circuit. By tracking the depth of the buffer circuit, the data rate, and the priority of each packet, packets can be selectively dropped prior to overflowing the buffer. This also allows the customer to dynamically change his service level depending on his bandwidth needs for each Internet access session. By embedding the new priority in each data packet, each data packet can be dropped or processed based on its own priority.

I claim:

1. A method for providing data packet congestion control for a data network having a buffer circuit, each data packet comprising a priority, the method comprising the steps of:

determining a particular service flow associated with a data packet;

detecting a data packet flow rate through the data network for the particular service flow associated with the data packet;

quantizing the data packet flow rate into at least one level;

detecting a buffer circuit depth;

determining the priority associated with the current data packet;

processing the packet in response to the current data packet flow rate, the data packet priority, and the current buffer circuit depth; and determining a probability of dropping the data packet using the data packet flow rate, the data packet priority, and the buffer circuit depth to access, from a matrix of plots indicating the probability of dropping the data packet, each of the plots within the matrix of plots indicating the packet drop probability as a function of the buffer circuit depth.

2. A method for providing data packet congestion control for a data network having a buffer circuit, each data packet comprising a priority, the method comprising the steps of:

determining a particular service flow associated with a data packet;

detecting a data packet flow rate through the data network for the particular service flow associated with the data packet;

quantizing the data packet flow rate into at least one level;

detecting a buffer circuit depth;

determining the priority associated with the current data packet;

processing the packet in response to the current data packet flow rate, the data packet priority, and the current buffer circuit depth; and determining a probability of dropping the data packet using the data packet flow rate, the data packet priority, and the buffer circuit depth to access, from a matrix of plots indicating the probability of dropping the data packet, each of the plots within the matrix of plots indicating the packet drop probability as a function of the buffer circuit depth with plots that have the same shape and parameters as the plots used for random early Discard congestion control techniques.

3. A method for providing data packet congestion control for a data network having a buffer circuit, each data packet having a priority associated therewith, the method comprising the steps of:

determining a particular service flow associated with a data packet;

detecting a current data packet flow rate through the data network for the particular service flow associated with the data packet;

quantizing the current data packet flow rate into one of four different flow rate categories by comparing the service flow's data packet flow rate with a minimum data rate threshold, a mid-level data rate threshold and a maximum data rate threshold, a first of the four different flow rate categories corresponding to a flow rate that is less than the minimum data rate threshold, a second category corresponding to a flow rate that is greater than the minimum threshold but less than the mid-level threshold, a third category corresponding to a flow rate that is greater than the mid-level threshold but less than the maximum threshold and a forth category corresponding to a flow rate that is greater than the maximum threshold;

determining the priority associated with the data packet; and processing the data packet in response to the current data packet flow rate category, the data packet priority, and a current buffer circuit depth.

* * * * *